(12) United States Patent
Ketharaju et al.

(10) Patent No.: US 12,517,705 B2
(45) Date of Patent: Jan. 6, 2026

(54) SYSTEMS AND METHODS FOR UNIVERSAL MACHINE LEARNING PIPELINE EXECUTION

(71) Applicant: Wells Fargo Bank, N.A., San Francisco, CA (US)

(72) Inventors: Rameshchandra Bhaskar Ketharaju, Hyderabad (IN); Anjeet Kumar, Bangalore (IN); Shuvam Sengupta, Kolkata (IN)

(73) Assignee: Wells Fargo Bank, N.A., San Francisco, CA (US)

(*) Notice: Subject to any disclaimer, the term of this patent is extended or adjusted under 35 U.S.C. 154(b) by 55 days.

(21) Appl. No.: 18/464,835

(22) Filed: Sep. 11, 2023

(65) Prior Publication Data

US 2025/0085935 A1    Mar. 13, 2025

(51) Int. Cl.
*G06F 8/35* (2018.01)
*G06F 8/30* (2018.01)
*G06F 11/34* (2006.01)
*G06N 20/00* (2019.01)

(52) U.S. Cl.
CPC ............. *G06F 8/35* (2013.01); *G06F 8/31* (2013.01); *G06F 11/3476* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2010/0185961 A1* | 7/2010 | Fisher | G06F 11/324 713/1 |
| 2020/0151154 A1* | 5/2020 | Kumar | G06F 16/211 |
| 2020/0242508 A1* | 7/2020 | Royo Bonnin | G06F 16/182 |
| 2021/0357843 A1* | 11/2021 | Yarlagadda | G06Q 40/02 |
| 2022/0076164 A1* | 3/2022 | Conort | G06N 20/00 |
| 2022/0129816 A1* | 4/2022 | Ralhan | G06F 40/216 |
| 2023/0065870 A1* | 3/2023 | Pyzow | G06N 3/10 |

(Continued)

FOREIGN PATENT DOCUMENTS

WO    2018183816 A1    10/2018

*Primary Examiner* — Qing Chen
(74) *Attorney, Agent, or Firm* — K&L Gates LLP (57) ABSTRACT

Systems, apparatuses, methods, and computer program products are disclosed for automated model development. An example method includes parsing, by configuration circuitry, a configuration file, and generating, by an execution engine and based on the parsed configuration file, model code for training and testing a machine learning model. The example method further includes generating, by the execution engine, a machine learning pipeline, wherein the machine learning pipeline comprises the model code and a data processing engine, and instantiating, by a monitoring driver, a monitoring engine to monitor the machine learning pipeline. The example method further includes causing execution, by the execution engine, of the machine learning pipeline, and during execution of the machine learning pipeline, generating model performance data by the monitoring engine. The example method further includes receiving, by from the execution engine, model output data, wherein the model output data comprises a trained model and model performance data.

20 Claims, 6 Drawing Sheets

(56) References Cited

U.S. PATENT DOCUMENTS

| | | | | |
|---|---|---|---|---|
| 2023/0083891 A1* | 3/2023 | Achin | ............... | G06F 3/0484 |
| | | | | 715/762 |
| 2023/0161843 A1 | 5/2023 | Ghanta et al. | | |
| 2023/0206610 A1* | 6/2023 | Pyzow | ............... | G06V 10/56 |
| | | | | 382/157 |
| 2023/0394327 A1* | 12/2023 | Frazier | ............... | G06F 11/3612 |
| 2024/0104394 A1* | 3/2024 | Skerry-Ryan | ............ | G06N 3/08 |
| 2024/0104429 A1* | 3/2024 | Datt | ............... | G06F 11/3495 |
| 2024/0111831 A1* | 4/2024 | Subramanian | ............ | G06F 17/11 |
| 2024/0134846 A1* | 4/2024 | Datt | ............... | G06N 3/09 |
| 2024/0135152 A1* | 4/2024 | Datt | ............... | G06N 3/048 |
| 2025/0077949 A1* | 3/2025 | Ponnalagu | ............ | G06N 20/00 |

\* cited by examiner

SYSTEMS AND METHODS FOR UNIVERSAL MACHINE LEARNING PIPELINE EXECUTION

BACKGROUND

Machine learning and artificial intelligence have become ubiquitous tools with applications in many industries. While many applications of machine learning may fall into well-established patterns, there is still a great degree of expertise needed to configure and use machine learning tools needed to develop a full production-level machine learning analysis.

BRIEF SUMMARY

Machine learning has grown to become one of the most important tools for sifting through vast amounts of data to find key insights, generate content in place of human actors (e.g., with generative artificial intelligence), and perform a great variety of other tasks previously thought to require human intervention. A large ecosystem of software tools exists for developing machine learning analyses and tools, ranging from small tools for specific purposes to complete packages that seek to perform the entire analysis from beginning to end.

While machine learning has become a crucial part of many industries, using the existing tools for developing machine learning analyses or products still requires a great deal of specific expertise, making their use costly. Furthermore, existing solutions for automating machine learning processes may lack flexibility or transparency, applying a "one size fits all" solution that restricts the options of more expert users or users in industries that require a certain solution that does not conform with the tool. Solutions also have limited monitoring capabilities, often using generic tools that may not be sufficient for the requirements of industries that need specific monitoring solutions (e.g., for regulatory purposes).

In contrast to these conventional techniques for machine learning, example embodiments described herein generate and/or execute a machine learning pipeline with integrated monitoring. Example embodiments may begin with a configuration file that specifies high-level requirements and settings of machine learning analysis, including training and testing dataset properties, additional input data, model requirements, monitoring conditions, and the like. Model code may be generated for executing the machine learning model based on the configuration file, and the machine learning pipeline may be instantiated with the model code and data processing elements. A monitoring engine may be instantiated and interfaced to the machine learning pipeline to provide integrated monitoring of the execution. After execution, model performance may be provided, including model outputs and model performance data.

Accordingly, the present disclosure sets forth systems, methods, and apparatuses that enable automation of machine learning pipelines with integrated monitoring. There are many advantages of these and other embodiments described herein. For instance, integrated monitoring tools enable close linkage between the monitoring and training, testing, and/or production elements of the machine learning pipeline, which would not be available with more generic monitoring solutions. In addition, example embodiments disclosed herein enable interfacing the machine learning pipeline with specialized data sources, including low-latency data sources, such as real-time market or transaction data. Finally, example embodiments enable the application of standardization frameworks into machine learning tools through the use of integrated monitoring and the flexibility of the configuration systems.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "model code" may refer to computer instructions for the purpose of training, testing, and or executing in production mode an artificial intelligence or machine learning model. The model code may be written in any particular computer programming language, and in some embodiments, the parsed configuration settings may indicate a particular programming language in which the model code is written. The term "model code" may be used to refer to the compiled computer instructions, in embodiments where the computer language used is a compiled programming language.

The term "machine learning pipeline" may refer to an entity comprising a plurality of computing elements arranged such that the output of an earlier element provides the input to a subsequent element. For example, the machine learning pipeline may include a data processing engine and model code, such that the data processing engine component provides processed data features to the model code component. The machine learning pipeline may include additional elements, such as those described below in example embodiments. In some embodiments, the machine learning pipeline may be implemented as a high-level script, such as a shell script, that may activate each element of the pipeline, make simple decisions based on the output and status of elements of the pipeline, and ensure that data flows from one element to the next.

The term "model performance data' may refer to a data construct containing data related to the operation of the model code and other elements of the machine learning pipeline, including metadata, performance profiling, debugging reports, monitoring logs, diagnostic printouts, memory snapshots, or the like. The content to appear in the model performance data may be selected by the configuration file, and subsequently the parsed configuration data. The model performance data may be archived, compressed, or otherwise transformed to efficiently deliver the model performance data to the user during or after the execution of the machine learning pipeline. The model performance data may include one or more individual files, such as log files produced by various processes of the machine learning pipeline.

System Architecture

Figure 1:
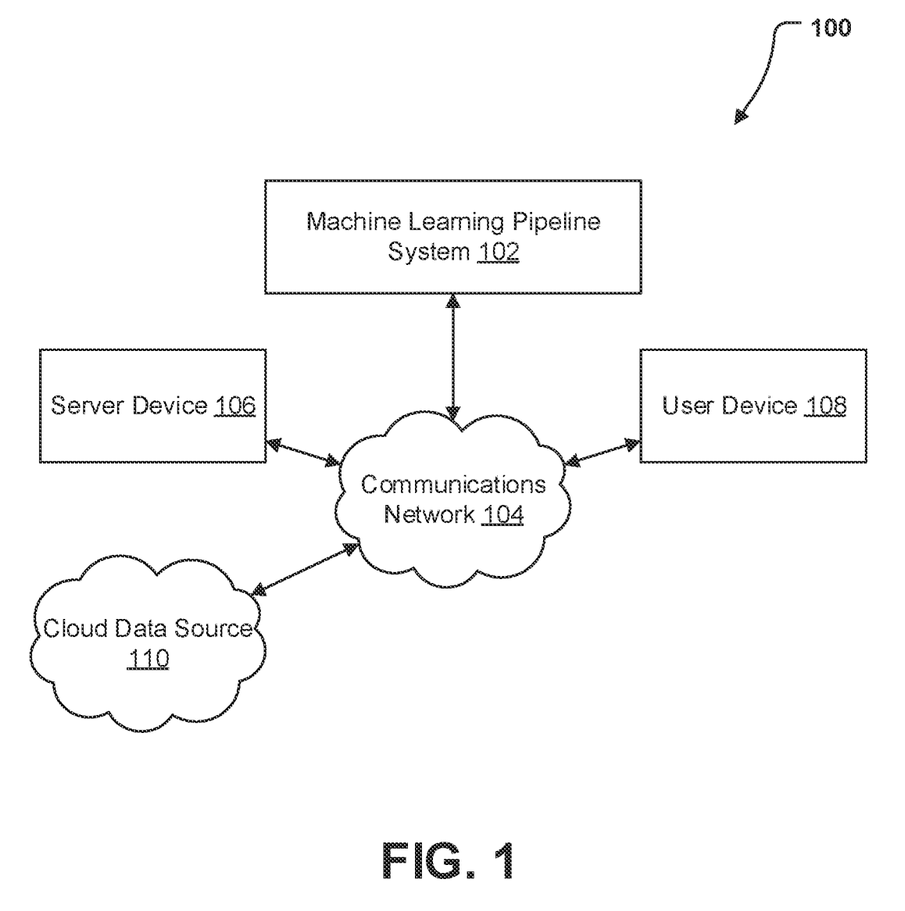
FIG. 1 illustrates a system in which some example embodiments may be used for generating and executing a machine learning pipeline.

Example embodiments described herein may be implemented using any of a variety of computing devices or servers. To this end, FIG. 1 illustrates an example environment 100 within which various embodiments may operate. As illustrated, a machine learning pipeline system 102 may receive and/or transmit information via communications network 104 (e.g., the Internet) with any number of other devices, such as a server device 106 and/or user device 108.

The machine learning pipeline system 102 may be implemented as one or more computing devices or servers, which may be composed of a series of components. Particular components of the machine learning pipeline system 102 are described in greater detail below with reference to apparatus 200 in connection with FIG. 2.

In some embodiments, the machine learning pipeline system 102 further includes a cloud data source 110 that comprises a distinct component from other components of the machine learning pipeline system 102. A cloud data source 110 may be embodied as one or more direct-attached storage (DAS) devices (such as hard drives, solid-state drives, optical disc drives, or the like) coupled to an external computing device or may alternatively comprise one or more Network Attached Storage (NAS) devices independently connected to a communications network (e.g., communications network 104). The cloud data source 110 may host the software executed to operate the machine learning pipeline system 102. The cloud data source 110 may store information relied upon during operation of the machine learning pipeline system 102, such as various data models, raw data, training datasets, trained models, or the like that may be used by the machine learning pipeline system 102, data and documents to be analyzed using the machine learning pipeline system 102, or the like. In addition, cloud data source 110 may store control signals, device characteristics, and access credentials enabling interaction between the machine learning pipeline system 102 and one or more of the server device 106 or user device 108.

The server device 106 and the user device 108 may be embodied by any computing devices known in the art. Although a single server device 106 and a single user device 108 are depicted in FIG. 1, in some embodiments a plurality of such devices (e.g. multiples of server device 106 and user device 108) may be connected via communications network 104. The server device 106 and the user device 108 need not themselves be independent devices, but may be peripheral devices communicatively coupled to other computing devices.

Although FIG. 1 illustrates an environment and implementation in which the machine learning pipeline system 102 interacts indirectly with a user via one or more of server device 106 and/or user device 108, in some embodiments users may directly interact with the machine learning pipeline system 102 (e.g., via communications hardware of the machine learning pipeline system 102), in which case a separate server device 106 and/or user device 108 may not be utilized. Whether by way of direct interaction or indirect interaction via another device, a user may communicate with, operate, control, modify, or otherwise interact with the machine learning pipeline system 102 to perform the various functions and achieve the various benefits described herein.

Example Implementing Apparatuses

Figure 2:
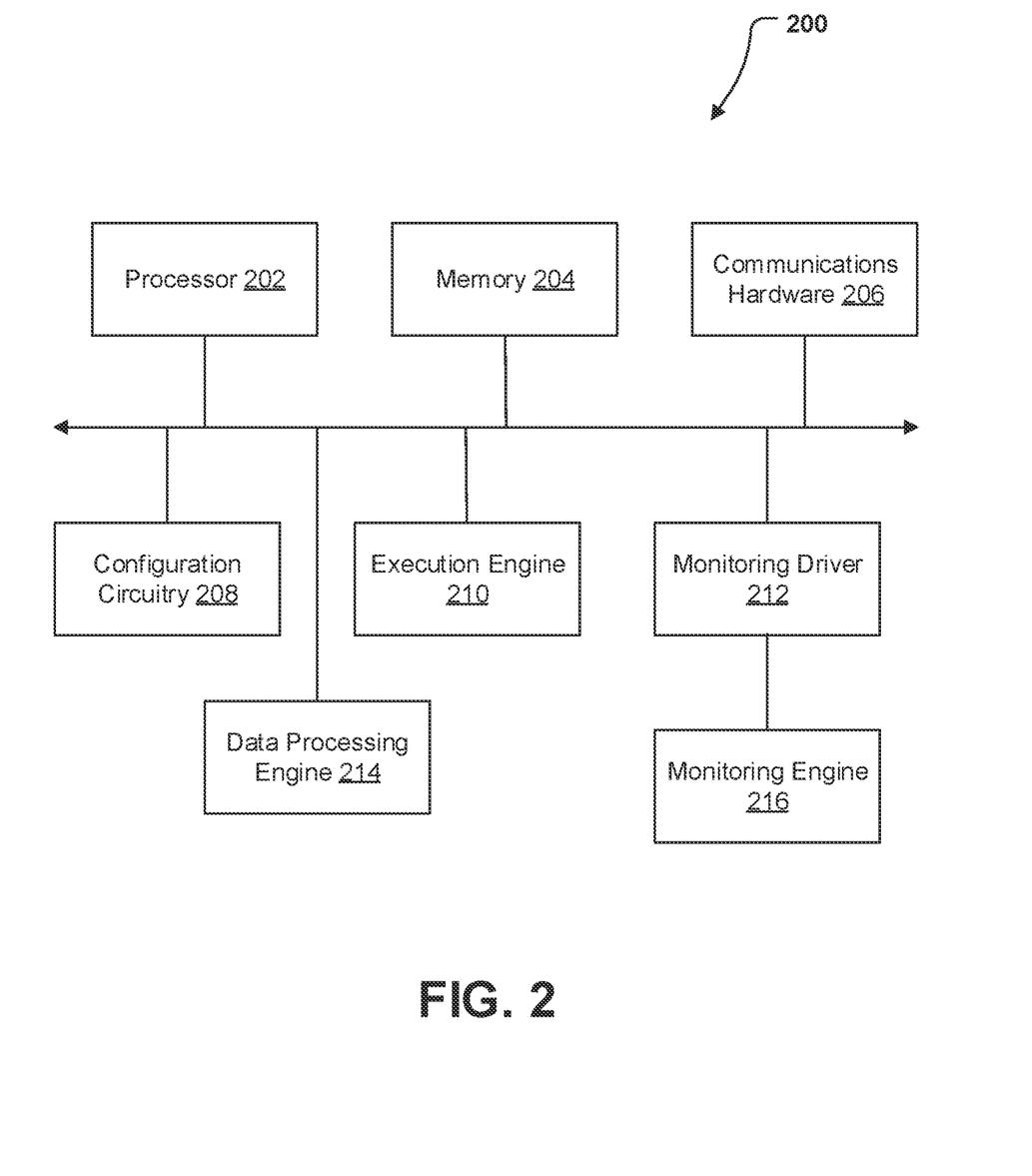
FIG. 2 illustrates a schematic block diagram of example circuitry embodying a system device that may perform various operations in accordance with some example embodiments described herein.

The machine learning pipeline system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-5. As illustrated in FIG. 2, the apparatus 200 may include processor 202, memory 204, communications hardware 206, configuration circuitry 208, execution engine 210, monitoring driver 212, data processing engine 214, and monitoring engine 216, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a configuration circuitry 208 that parses configuration files. The configuration circuitry 208 may utilize processor 202, memory 204, or any other hardware component included in the apparatus 200 to perform these operations, as described in connection with FIGS. 3-6 below. The configuration circuitry 208 may further utilize communications hardware 206 to gather data from a variety of sources (e.g., server device 106, user device 108, or cloud data source 110, as shown in FIG. 1), and/or exchange data with a user, and in some embodiments may utilize processor 202 and/or memory 204 to parse configuration files.

In addition, the apparatus 200 further comprises an execution engine 210 that generates model code and causes execution of the machine learning pipeline. The execution engine 210 may utilize processor 202, memory 204, or any other hardware component included in the apparatus 200 to perform these operations, as described in connection with FIGS. 3-6 below. The execution engine 210 may further utilize communications hardware 206 to gather data from a variety of sources (e.g., server device 106, user device 108, and/or cloud data source 110, as shown in FIG. 1), and/or exchange data with a user, and in some embodiments may utilize processor 202 and/or memory 204 to generate model code and cause execution of the machine learning pipeline.

Further, the apparatus 200 further comprises a monitoring driver 212 that instantiates a monitoring engine 216 to monitor the machine learning pipeline. The monitoring driver 212 may utilize processor 202, memory 204, or any other hardware component included in the apparatus 200 to perform these operations, as described in connection with FIGS. 3-6 below. The monitoring driver 212 may further utilize communications hardware 206 to gather data from a variety of sources (e.g., server device 106, user device 108, and/or cloud data source 110, as shown in FIG. 1), and/or exchange data with a user, and in some embodiments may utilize processor 202 and/or memory 204 to instantiate the monitoring engine 216.

Further, the apparatus 200 further comprises a data processing engine 214 that accesses and stages data from a data store and provides data features to the machine learning pipeline. The data processing engine 214 may utilize processor 202, memory 204, or any other hardware component included in the apparatus 200 to perform these operations, as described in connection with FIGS. 3-6 below. The data processing engine 214 may further utilize communications hardware 206 to gather data from a variety of sources (e.g., server device 106, user device 108, and/or cloud data source 110, as shown in FIG. 1), and/or exchange data with a user, and in some embodiments may utilize processor 202 and/or memory 204 to accesses and stages data from a data store and provides data features to the machine learning pipeline.

Finally, the apparatus 200 further comprises one or more monitoring engine 216 that monitor the machine learning pipeline according to the conditions set forth in the configuration file. The monitoring engine 216 may utilize processor 202, memory 204, or any other hardware component included in the apparatus 200 to perform these operations, as described in connection with FIGS. 3-6 below. The monitoring engine 216 may further utilize communications hardware 206 to gather data from a variety of sources (e.g., server device 106, user device 108, and/or cloud data source 110, as shown in FIG. 1), and/or exchange data with a user, and in some embodiments may utilize processor 202 and/or memory 204 to monitor the machine learning pipeline. Although a single monitoring engine 216 is depicted in FIG. 2, it will be understood that the monitoring driver 212 may instantiate and configure a plurality of monitoring engine 216, for example, to provide multiple monitoring configurations for the machine learning pipeline.

Although components 202-216 are described in part using functional language, it will be understood that the particular implementations necessarily include the use of particular hardware. It should also be understood that certain of these components 202-216 may include similar or common hardware. For example, the configuration circuitry 208, execution engine 210, monitoring driver 212, data processing engine 214, and monitoring engine 216 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry," "engine," and "driver" with respect to elements of the apparatus therefore shall be interpreted as necessarily including the particular hardware configured to perform the functions associated with the particular element being described. Of course, while the terms "circuitry," "engine," and "driver" should be understood broadly to include hardware, in some embodiments, the terms "circuitry," "engine," and "driver" may in addition refer to software instructions that configure the hardware components of the apparatus 200 to perform the various functions described herein.

Although the configuration circuitry 208, execution engine 210, monitoring driver 212, data processing engine 214, and monitoring engine 216 may leverage processor 202, memory 204, or communications hardware 206 as described above, it will be understood that any of configuration circuitry 208, execution engine 210, monitoring driver 212, data processing engine 214, and monitoring engine 216 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that configuration circuitry 208, execution engine 210, monitoring driver 212, data processing engine 214, and monitoring engine 216 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Figure 3:
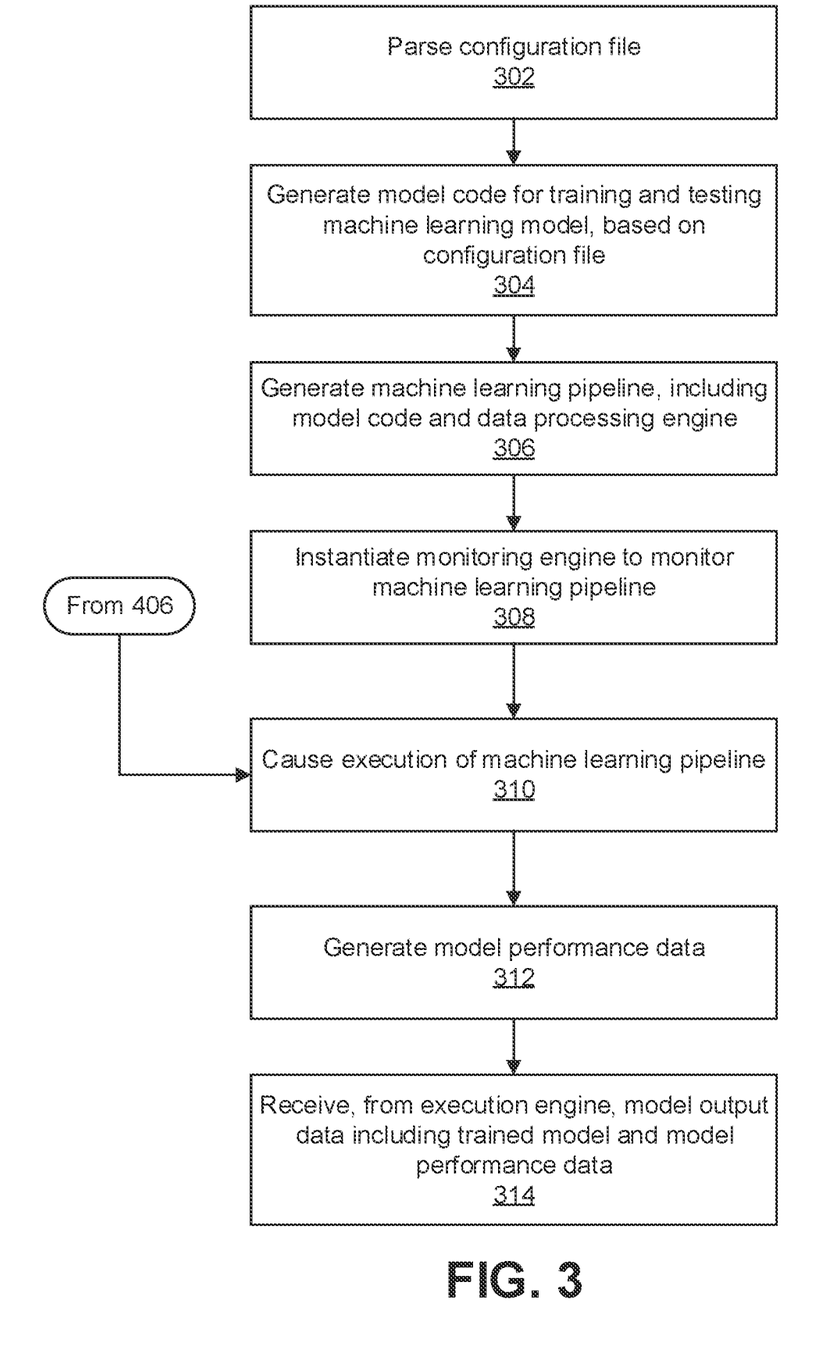
FIG. 3 illustrates an example flowchart for generating and executing a machine learning pipeline, in accordance with some example embodiments described herein.
Figure 4:
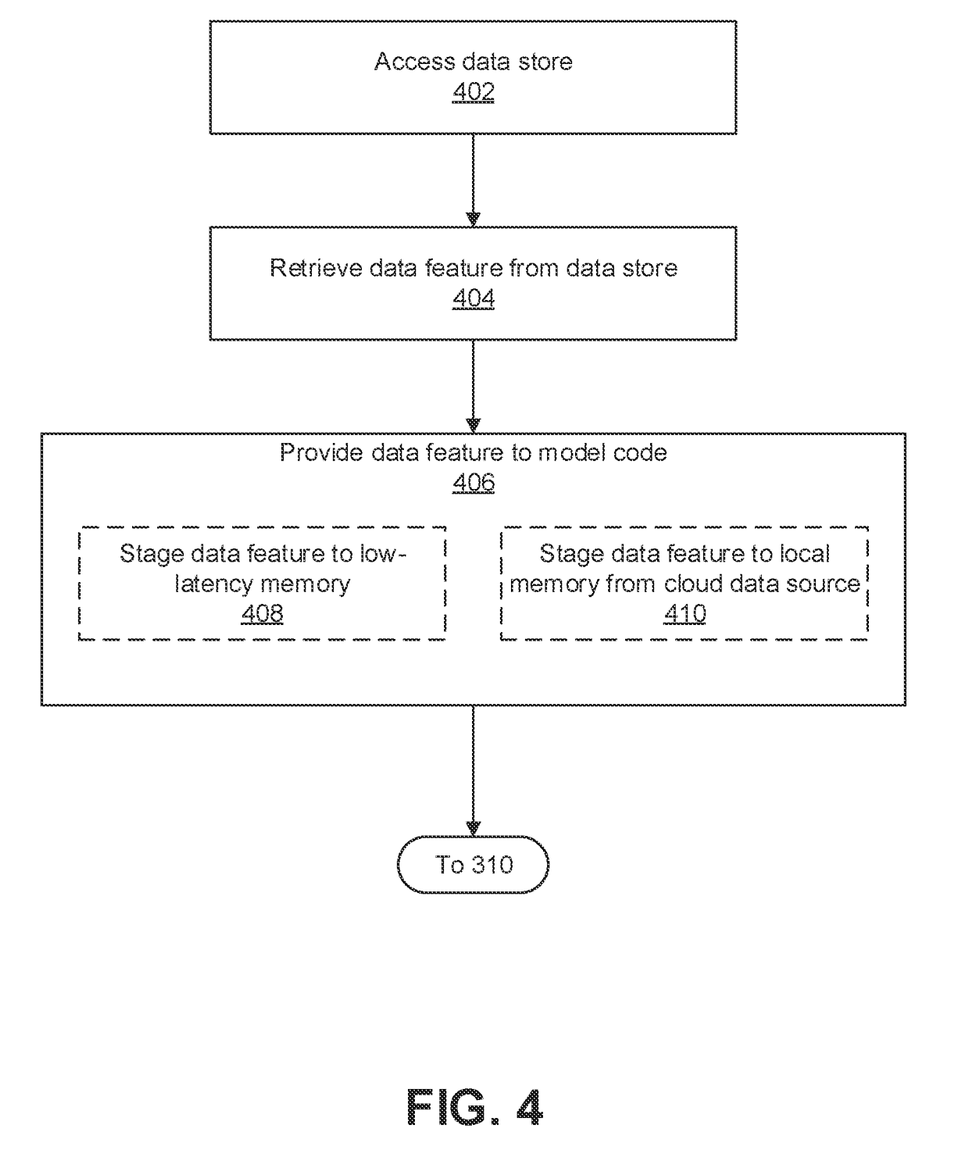
FIG. 4 illustrates an example flowchart for providing and staging input data to the machine learning pipeline, in accordance with some example embodiments described herein.
Figure 5:
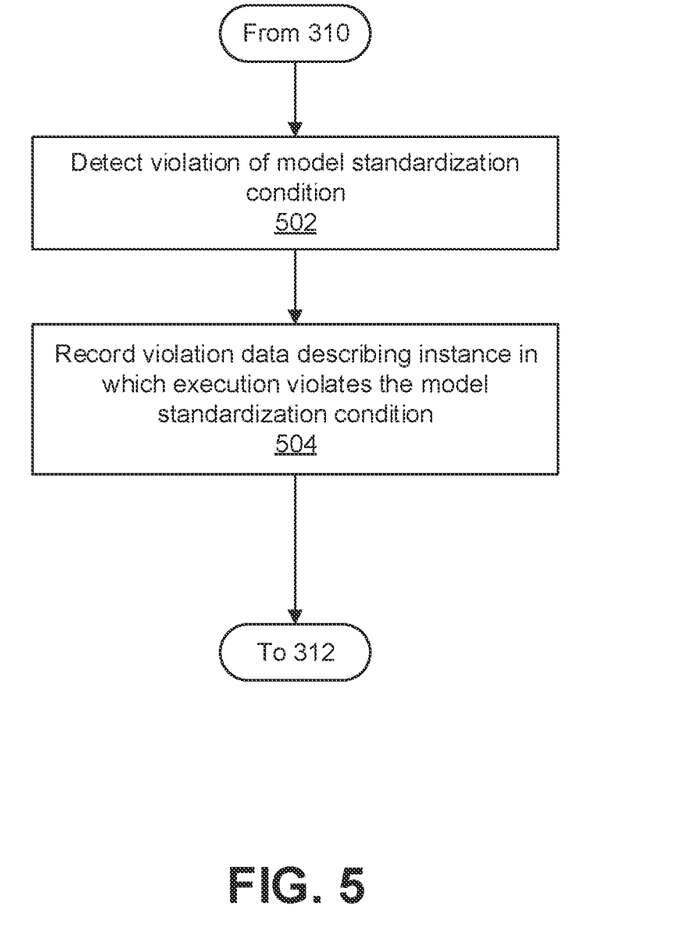
FIG. 5 illustrates an example flowchart for providing monitoring services in connection with execution of the machine learning pipeline, in accordance with some example embodiments described herein.

Turning to FIGS. 3-5, example flowcharts are illustrated that contain example operations implemented by example embodiments described herein. The operations illustrated in FIGS. 3-5 may, for example, be performed the machine learning pipeline system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, configuration circuitry 208, execution engine 210, monitoring driver 212, data processing engine 214, monitoring engine 216, and/or any combination thereof. It will be understood that user interaction with the machine learning pipeline system 102 may occur directly via communications hardware 206, or may instead be facilitated by a separate user device 108, as shown in FIG. 1, and which may have similar or equivalent physical componentry facilitating such user interaction.

Turning first to FIG. 3, example operations are shown for generating and executing a machine learning pipeline. As shown by operation 302, the apparatus 200 includes means, such as processor 202, memory 204, communications hardware 206, configuration circuitry 208, or the like, for parsing a configuration file. In some embodiments, the configuration file may be received via communications hardware 206, using attached network hardware, and provided by an external computing device such as server device 106, user device 108, or cloud data source 110. In some embodiments, the configuration file may be retrieved from storage embodied by memory 204, including volatile or non-volatile storage, or retrieved from other network-attached storage devices.

The configuration file may be a permanent file located on a file storage system, but it will be understood that in some embodiments, the configuration file may not be embodied by a permanent file located on a file storage system (e.g., a text configuration is provided by a pipe operator in a Unix-based operating system). Whether the configuration is provided by a permanent file or by other means, the term "configuration file" may refer to a collection of text data providing configuration instructions for the machine learning pipeline system 102 to generate and/or execute the machine learning pipeline.

The configuration file may be a string, collection set of strings, or other data structure containing text data, and may be collected and organized as a plaintext file, YAML, JSON, XML, or any other file type of the like. In some embodiments, the configuration file may contain a series of pairs, each pair including a name or title of a setting paired together with the value of the setting. For example, the configuration file may contain the pair "outputFilePath:/home/user1/output/" where "outputFilePath" is the name of the setting and "/home/user1/output/" is the value of the setting.

The configuration file may include a number of settings chosen from among a larger list of possible settings. In some embodiments, settings that are not explicitly included in the configuration file may automatically be given default values. Examples of types of settings that may be specified in the configuration file include file access settings, such as input and output file locations, network addresses relevant to file access, network protocols, authentication, or other information needed to access files, indication of low-latency or streaming data, indication that input and/or output data is spread among multiple sources, and/or the like. Further examples of types of settings include machine learning model settings, such as an indication of the type of model (e.g., neural network, decision tree, support vector machine), an indication of the type of learning mode (e.g., supervised, unsupervised), hardware or computing requirements and limits for the execution of the model, location of a pre-trained model to import, hyperparameters or other settings specific to a model (e.g., number of neural network layers, indication of a regularization function), and/or the like. Another example of the types of configuration settings includes execution and monitoring settings, such as the number of CPU cores to utilize, the amount of volatile memory to utilize, location and access information for non-local computing resources for batch processing, indication of settings for graphical processing unit (GPU) processing, types of behavior to monitor during execution, parameters to report during execution, debugging flags and settings to utilize during execution, and/or the like.

In some embodiments, the configuration file includes an indication of a programming language. In some embodiments, the model code includes computer instructions written in the programming language. For example, the configuration may have a setting such as "modelCodeLanguage: python" that may indicate the machine learning pipeline system 102 should generate the model code using the Python programming language. In some embodiments, the indication of the programming language in the configuration file may cause the machine learning pipeline system 102 to generate model code using computer instructions in the indicated programming language. In some embodiments, the machine learning pipeline system 102 may generate computer instructions using a programming language that must be compiled, and the machine learning pipeline system 102 may both generated the uncompiled computer instructions and the compiled computer instructions, thus enabling the user to view and modify the uncompiled computer instructions if desired.

The configuration circuitry 208 may parse the configuration file and convert the text-based configuration settings to settings for internal use stored in memory 204. The parsed configuration settings may be used to direct the operation of the machine learning pipeline system 102 in subsequent example operations described below. As mentioned previously, settings not explicitly present in the configuration file may be given default configurations. The configuration circuitry 208 may also scan the configuration files for errors such as improper setting values, misspellings, or the like, and halt execution if errors prevent the parsing of the configuration file. The configuration circuitry 208 may also produce a log of the parsing of the configuration file, including informational statements, errors and warnings of configurations that are not severe enough to halt execution.

As shown by operation 304, the apparatus 200 includes means, such as processor 202, memory 204, communications hardware 206, execution engine 210, or the like, for generating, based on the parsed configuration file, model code for training and testing a machine learning model. The execution engine 210 may use the parsed configuration settings (which may be obtained as described in connection with example operation 302), to generate computer instructions in the form of model code. The model code may be computer instructions for the purpose of training, testing, and or executing in production mode an artificial intelligence or machine learning model. The model code may be written in any particular computer programming language, and in some embodiments, the parsed configuration settings may indicate a particular programming language in which the model code is written. The term "model code" may be used to refer to the compiled computer instructions, in embodiments where the computer language used is a compiled programming language.

In some embodiments, the model code may be based on a collection of template code functions that may be modified according to the parsed configuration settings. The execution engine 210 may use the parsed configuration instructions and apply a rules-based method to decide on the template model code to customize and assemble to generate the complete model code. The execution engine 210 may further perform static analysis on the complete model code to check for errors or unoptimized portions of the model code. The execution engine 210 may automatically update and correct any issues detected by static analysis, or may report issues to the user, depending on the configuration of the execution engine 210.

As shown by operation 306, the apparatus 200 includes means, such as processor 202, memory 204, communications hardware 206, execution engine 210, data processing engine 214 or the like, for generating a machine learning pipeline, where the machine learning pipeline includes the model code and a data processing engine 214. The machine learning pipeline may comprise a plurality of elements arranged such that the output of an earlier element provides the input to a subsequent element. In some embodiments, the machine learning pipeline may include the data processing engine (e.g., data processing engine 214) and the model code, such that the data processing engine component provides processed data features to the model code component. The machine learning pipeline may include additional elements, such as those described below in example embodiments. In some embodiments, the machine learning pipeline may be implemented as a high-level script, such as a shell script, that may activate each element of the pipeline, make simple decisions based on the output and status of elements of the pipeline, and ensure that data flows from one element to the next.

As shown by operation 308, the apparatus 200 includes means, such as processor 202, memory 204, communications hardware 206, monitoring driver 212, or the like, for instantiating a monitoring engine (e.g., monitoring engine 216) to monitor the machine learning pipeline. In some embodiments, the monitoring driver 212 may instantiate the monitoring engine 216, which may subsequently attach or monitor the processes of the machine learning pipeline as they are executed in volatile memory 204. In some embodiments, the monitoring driver 212 may be part of the machine learning pipeline. In some embodiments, the monitoring engine 216 may be a separate process, and the monitoring engine 216 may even be embodied as a third-party debugger, profiler, or other tool for monitoring and collecting information on processes in memory 204. For example, the configuration file may specify that monitoring is to be enabled using a built-in tool, and additional monitoring may be provided using the debugger gcc. The parsed configuration settings may be passed to the monitoring driver 212 as part of the machine learning pipeline, and the monitoring driver 212 may cause the execution of the built-in monitoring tool and the gcc debugger. The monitoring driver 212 may continue to ensure that the monitoring processes are active, and may restart the monitoring processes if they are aborted or crash. After execution, the monitoring driver 212 may collect data from the monitoring processes, for example, as described in FIG. 5.

It will be understood that, in some embodiments, the monitoring driver 212 may instantiate monitoring engine 216 after the machine learning pipeline system 102 causing execution of the machine learning pipeline, such that the monitoring engine 216 may be attached to the active machine learning pipeline process or processes in memory 204. In some embodiments, the monitoring driver 212 may instantiate the monitoring engine 216 prior to the machine learning pipeline system 102 causing execution of the machine learning pipeline, which may wait in a ready state for the machine learning pipeline processes to begin.

As shown by operation 310, the apparatus 200 includes means, such as processor 202, memory 204, communications hardware 206, execution engine 210, or the like, for causing execution of the machine learning pipeline. In some embodiments, the execution engine 210 may cause execution of the machine learning pipeline by passing execution instructions to the processor 202, to an operating system, a batch system (which may be embodied, for example, by a server device 106), or the like. In some embodiments, the machine learning pipeline, including each of its constituent elements, may be compiled, linked, bundled together, archived, compressed, and/or transmitted to enable execution of the machine learning pipeline. In some embodiments, the execution engine 210 may further cause execution of an attached monitoring engine 216 from the machine learning pipeline. The execution engine 210 may also instantiate logging and file output services and ensure that data may be written to logging and file output areas.

In some embodiments, the configuration file may comprise an indication of a model environment, and the indication of the model environment may be drawn from a list of model environments, including training, testing, and production. In some embodiments, causing execution of the machine learning pipeline may use the model environment. For example, the execution engine 210 may be configured to operate with a training model environment, which may use an input training dataset to find parameters of a machine learning model embodied in the model code. The execution engine 210 may execute the same machine learning pipeline in a different model environment, the testing environment, which may fix the parameters found in the training model environment, and use testing data to analyze the performance of the model code, identify overtraining, or the like. For another example, the model code operating in the production environment may be used to classify production input data using a trained model that has been previously tested and studied in a testing model environment. The production environment may then emphasize performance and speed and may, in some embodiments, disable various diagnostics and/or debugging elements of the model code.

As shown by operation 312, the apparatus 200 includes means, such as processor 202, memory 204, communications hardware 206, execution engine 210, monitoring engine 216, or the like, for, during execution of the machine learning pipeline, generating model performance data. The monitoring engine 216 and/or the execution engine 210 may generate model performance data, which may be captured and stored in memory 204, and in some embodiments, received by communications hardware 206 (e.g., in an instance in which the machine learning pipeline execution takes place on a remote server device 106). The model performance data may be a data construct containing data related to the operation of the model code and other elements of the machine learning pipeline, including metadata, performance profiling, debugging reports, monitoring logs, diagnostic printouts, memory snapshots, or the like. The content to appear in the model performance data may be selected by the configuration file, and subsequently the parsed configuration data. The model performance data may be archived, compressed, or otherwise transformed to efficiently deliver the model performance data to the user during or after the execution of the machine learning pipeline. The model performance data may include one or more individual files, such as log files produced by various processes of the machine learning pipeline. In some embodiments, the model performance data may be accessible during execution of the machine learning pipeline, enabling components of the machine learning pipeline system 102 and/or other systems to read real-time model performance data during the execution of the machine learning pipeline. For example, a monitoring engine 216 may produce and/or track the model performance data during execution and issue various commands based on certain conditions that model code enters, as reflected in the model performance data.

As shown by operation 314, the apparatus 200 includes means, such as processor 202, memory 204, communications hardware 206, or the like, for receiving model output data from the execution engine 210. The model output data may include a trained model and model performance data. The model performance data may be the data construct as described above, in connection with operation 312. The model output data and model performance data may be bundled together (e.g., archived, compressed, or the like), or may be located separately, in output directories specified in the configuration file, or elsewhere depending on the configuration of the execution engine 210 and other components of the apparatus 200.

In some embodiments, receiving the model output data may comprise storing the model output data on a cloud data store (e.g., embodied by a cloud data source 110). The configuration file may comprise an indication of storing the model output data to the cloud data store. For example, the execution of the machine learning pipeline may take place on a remote server device 106 or a cloud computing service, and output from the machine learning pipeline may be staged to a remote storage device such as cloud data source 110. In some embodiments, the communications hardware 206 may automatically retrieve the model output data and/or model performance data from the cloud data source 110, or the model output data and/or model performance data may remain on the cloud data source 110 until remote access is requested for reviewing model outputs.

In some embodiments, the model output data may be displayed using a specialized visualizer process. The visualizer may summarize important alerts, warnings, performance characteristics, or the like from the model performance data, and/or may summarize the model output data by showing the results of the model code training, testing, and/or production results.

Turning now to FIG. 4, example operations are shown for providing and staging input data to the machine learning pipeline. The example operations depicted in FIG. 4 may be performed optionally in some embodiments of the apparatus 200, and the example operations of FIG. 4 may be performed before the execution of the machine learning pipeline (e.g., operation 310 of FIG. 4) as shown. As shown by operation 402, the apparatus 200 includes means, such as processor 202, memory 204, communications hardware 206, data processing engine 214, or the like, for accessing a data store. The data store may be embodied in any local storage device (e.g., embodied by memory 204) or may be a remote storage device, server, cloud service, or other storage solution (e.g., embodied by server device 106 and/or cloud data source 110). In some embodiments, data may be staged to a data store from a secondary source. For example, a remote device may house the data, and the data may be downloaded to the data store (which may itself be remote, or local to apparatus 200) for processing. In some embodiments, the data store may stage the data from long-term storage, such as a tape archive or compressed format. In some embodiments, the configuration file may specify that the data store may automatically stage the data to the data store so that it may be readily accessed.

As shown by operation 404, the apparatus 200 includes means, such as processor 202, memory 204, communications hardware 206, data processing engine 214, or the like, for retrieving a data feature from the data store. The data processing engine 214 may identify one or more data features from the data store that may be provided as input to the model code. The data processing engine 214 may perform infilling, cleaning, or other data preparation operations in connection with operation 404 to provide the data feature to the model code. In some embodiments, a plurality of data features may be retrieved and provided simultaneously or in parallel, and in some embodiments each data feature may be retrieved separately. For example, a machine learning pipeline may be generated so that one feature is located in a first data store, and a second feature is located in a second data store. The data processing engine 214 may, based on the parsed configuration settings, obtain data features from a plurality of sources and manage the combination of data features to seamlessly provide the data features to the model code (and/or other subsequent elements of the machine learning pipeline).

As shown by operation 406, the apparatus 200 includes means, such as processor 202, memory 204, communications hardware 206, data processing engine 214, or the like, for providing a data feature to the model code. As described previously in connection with operation 404, the data processing engine 214 may provide the data feature retrieved from the data store to the model code. In some embodiments, the model code is executed locally to apparatus 200, and the data feature may be provided directly (e.g., via the bus). In some embodiments, operation 406 may be performed in accordance with operation 408 and/or operation 410, described below.

As shown by operation 408, the apparatus 200 may include means, such as processor 202, memory 204, communications hardware 206, data processing engine 214, or the like, for staging the data feature to a low-latency memory. In some embodiments, data may be streamed from a remote source in real time requiring certain operations to stage the data from the data store. For example, the machine learning pipeline system 102 may be run in production mode to analyze real-time pricing data from a market. The real-time pricing data may be streamed from a network source, which may be staged to low-latency memory and processed so that the pricing data can be analyzed at the rate it is received. The low-latency memory may be embodied by volatile memory 204 or other storage that may avoid relatively slow operations such as reading and writing to a physical hard disk.

Finally, as shown by operation 410, the apparatus 200 may include means, such as processor 202, memory 204, communications hardware 206, data processing engine 214, or the like, for staging the data feature to a local memory from the cloud data source. In some embodiments, the data processing engine 214 may automatically and transparently stage the data feature to local memory (e.g., memory 204) from a cloud data source (e.g., cloud data source 110). For example, the configuration file may specify a data feature logically rather than specifying the physical location of the data, and the data processing engine 214 may automatically retrieve the data feature specified in the configuration file from cloud data source 110. In an event in which the data is automatically retrieved from cloud data source 110, the data processing engine 214 may additionally stage the cloud-based data to a local memory 204 to improve access times and avoid excessive network access of the cloud-based data.

Turning now to FIG. 5, example operations are shown for providing monitoring services in connection with execution of the machine learning pipeline. As shown by operation 502, the apparatus 200 includes means, such as processor 202, memory 204, communications hardware 206, monitoring engine 216, or the like, for detecting a violation of the model standardization condition. The monitoring engine 216 may, when attached or active and monitoring the execution of the machine learning pipeline, be configured to detect certain violations of model standardization conditions. The model standardization conditions may impose certain limits on parameters and/or behaviors of the model code so that values remain within various rules-based limits. For example, regulatory agencies may require bounds on models used for certain purposes, or users may wish to be alerted if values fall outside of physically sensible boundaries (e.g., if time duration quantities become negative, if a credit score value moves outside of the bounds of possible credit scores). The monitoring engine 216 may receive real-time monitoring information via an application programming interface (API) and/or by parsing an output file or file object generated during execution of the machine learning pipeline. In some embodiments, the monitoring engine 216 may observe values in memory 204 directly without the use of an API or file object as intermediary.

Finally, as shown by operation 504, the apparatus 200 includes means, such as processor 202, memory 204, communications hardware 206, monitoring engine 216, or the like, for recording, to a monitoring log, violation data describing the instance in which the execution of the machine learning pipeline violates the model standardization condition. The monitoring engine 216 may, based on detecting a violation of a model standardization condition, record the violation data to the monitoring log. The monitoring log may be included in the model performance and/or model output data.

Figure 6:
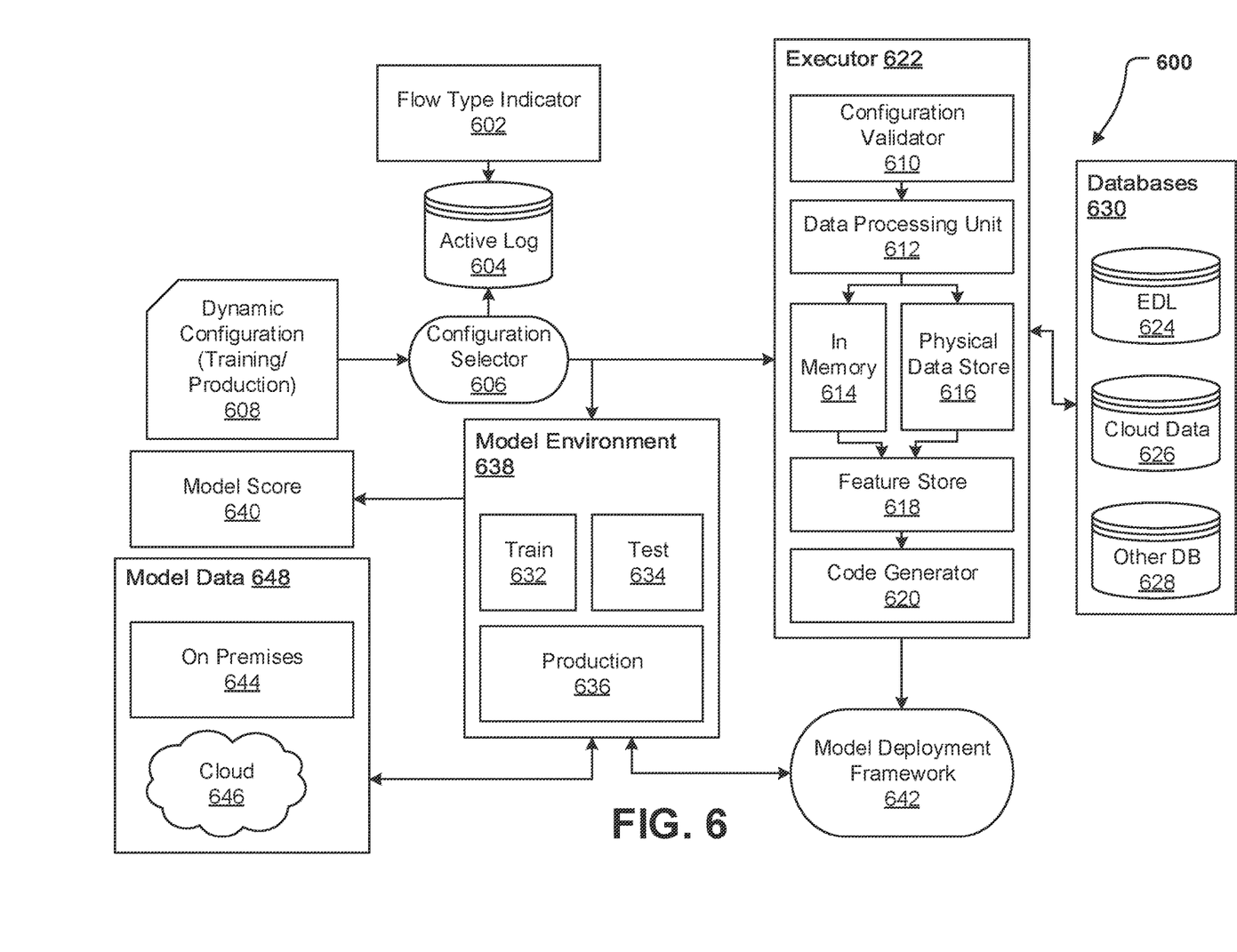
FIG. 6 illustrates an example flowchart providing an overview of an example machine learning pipeline, in accordance with some example embodiments described herein.

Turning to FIG. 6, a high-level flowchart is provided that illustrates an example implementation of the methods disclosed herein. As noted previously, a user may interact with the machine learning pipeline system 102 (embodied by the apparatus 200) and, optionally, one or more of server device 106, user device 108, and/or cloud data source 110 (e.g., via the communications network 104). The example machine learning pipeline 600 depicted is an example of a machine learning pipeline generated and/or executed by one embodiment of the machine learning pipeline system 102. The flow type indicator 602 may provide high-level configuration of the example machine learning pipeline 600, indicating rules for logging, execution sequence, operating system-level parameters, and/or the like. The active log 604 may include a directory or repository for all logging performed by various processes of the example machine learning pipeline 600. In the event that the example machine learning pipeline 600 is running in a training or production mode, a dynamic configuration 608 may be provided to automatically generate a configuration file based on high-level requirements. The configuration selector 606 may select a configuration file, parse the file, and log the results of the configuration file, then pass execution to the appropriate element of example machine learning pipeline 600 as indicated by the configuration. The executor 622 may provide a sequence of elements for generating model code based on the configuration file. The configuration validator 610 may provide additional validation of the parsed configuration file. The data processing unit 612 may use the configured data processing settings to access an appropriate data store, such as data found in memory 614 (e.g., having been staged to memory 204 from another process) or in a physical data store 616. The data may be processed and represented as data features, and a feature store 618 may provide an interface to access features in the data. Finally, the code generator 620 element may generate model code based on the data features and parsed configuration file.

The elements of the executor 622 may be coupled with one or more databases 630. Example databases may include an enterprise data lake (EDL) 624, cloud data 626, or other databases 628. The model code may be deployed to a model environment 638, where the model environment may be configured to train 632, test 634, or for production 636. The output of the model environment execution may include a model score 640, which may be a classifier output, training result, or the like. The outputs of the model environment 638 and/or executor 622, including model code, training and testing results, and/or the like, may be provided to a model deployment framework 642, which may automate certain elements of the execution and deployment of the example machine learning pipeline 600. The model deployment framework 642 may in turn receive requests to execute the model environment 638 and provide inputs from an external source. Finally, the model data 648 may include on premises 644 and/or cloud 646 data that may provide input for a model environment 638 (e.g., prompts, data for classification, labeled data, and/or the like) and also receive output from the model environment to be stored as model data 648.

FIGS. 3-6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable improved and automated generation and execution of machine learning pipelines with integrated monitoring. Example embodiments thus provide tools that overcome the problems faced by analysts seeking to perform a machine learning analysis, particularly those who may lack time or expertise to develop computer code for such an analysis. Example embodiments enable analysts to enter high-level directives in a configuration file while still maintaining customizability and transparency that are critical in certain industries. Moreover, embodiments described herein also provide advantage to experienced analysts who have the expertise to develop machine learning code by exposing model code in the user's desired programming language. The automatically generated computer code may be customized or integrated into other projects or tools by the expert developer.

As these examples all illustrate, example embodiments contemplated herein provide technical solutions that solve real-world problems faced during development of machine learning analyses. And while machine learning and artificial intelligence have been current technologies for decades, the recently exploding amount of data made available by recently emerging technology today has made this problem significantly more acute, as the demand for machine learning analyses on vast datasets has grown significantly even while the complexity of the typical machine learning analysis has itself increased. At the same time, the recently arising ubiquity of machine learning has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for automated model development, the method comprising:
   parsing, by configuration circuitry, a configuration file indicating a machine learning model;
   generating, by an execution engine and based on the parsed configuration file, model code for training and testing the machine learning model;

generating, by the execution engine, a machine learning pipeline, wherein the machine learning pipeline comprises the model code and a data processing engine;

instantiating, by a monitoring driver, a monitoring engine to monitor the machine learning pipeline;

causing execution, by the execution engine, of the machine learning pipeline;

during the execution of the machine learning pipeline:
  detecting, by the monitoring engine, a modification of a parameter of the machine learning model,
  determining, by the monitoring engine and based on the modification of the parameter of the machine learning model, a violation of a model standardization condition, and
  generating, by the monitoring engine, model performance data in real time simultaneously with execution of the model code of the machine learning pipeline, wherein the model performance data comprises an indication of the violation of the model standardization condition; and receiving, by communications hardware and from the execution engine, model output data, wherein the model output data comprises a trained model and model performance data.

2. The method of claim 1, further comprising:
accessing, by the data processing engine, a data store;
retrieving, by the data processing engine, a data feature from the data store; and
providing, by the data processing engine, the data feature to the model code.

3. The method of claim 2, wherein the data store comprises a low-latency data source, and wherein providing the data feature to the model code comprises:
staging, by the data processing engine, the data feature to a low-latency memory.

4. The method of claim 2, wherein the data store comprises a cloud data source, and wherein providing the data feature to the model code comprises:
staging, by the data processing engine, the data feature to a local memory from the cloud data source.

5. The method of claim 1, wherein the configuration file comprises an indication of a programming language, and wherein the model code comprises computer instructions written in the programming language.

6. The method of claim 1, wherein the configuration file comprises an indication of the model standardization condition, and wherein the method further comprises:
recording, by the monitoring engine and to a monitoring log, violation data describing the violation of the model standardization condition.

7. The method of claim 1,
wherein the configuration file comprises an indication of a model environment,
wherein the indication of the model environment is drawn from a list of model environments,
wherein the list of model environments comprises training, testing, and production, and
wherein causing the execution of the machine learning pipeline uses the model environment.

8. The method of claim 1, wherein receiving the model output data comprises:
storing, by the communications hardware, the model output data on a cloud data store, wherein the configuration file comprises an indication of storing the model output data to the cloud data store.

9. An apparatus for automated model development, the apparatus comprising:

configuration circuitry configured to parse a configuration file indicating a machine learning model;

an execution engine configured to:
  generate, based on the parsed configuration file, model code for training and testing the machine learning model; and
  generate a machine learning pipeline, wherein the machine learning pipeline comprises the model code and a data processing engine;

a monitoring driver configured to instantiate a monitoring engine to monitor the machine learning pipeline, wherein the execution engine is further configured to cause execution of the machine learning pipeline, and wherein the monitoring engine is further configured to, during the execution of the machine learning pipeline:
  detect a modification of a parameter of the machine learning model,
  determine, based on the modification of the parameter of the machine learning model, a violation of a model standardization condition, and
  generate model performance data in real time simultaneously with execution of the model code of the machine learning pipeline, wherein the model performance data comprises an indication of the violation of the model standardization condition; and communications hardware configured to receive, from the execution engine, model output data, wherein the model output data comprises a trained model and model performance data.

10. The apparatus of claim 9, wherein the data processing engine is configured to:
access a data store;
retrieve a data feature from the data store; and
provide the data feature to the model code.

11. The apparatus of claim 10, wherein the data store comprises a low-latency data source, and wherein the data processing engine is configured such that providing the data feature to the model code comprises:
staging the data feature to a low-latency memory.

12. The apparatus of claim 10, wherein the data store comprises a cloud data source, and wherein the data processing engine is configured such that providing the data feature to the model code comprises:
staging the data feature to a local memory from the cloud data source.

13. The apparatus of claim 9, wherein the configuration file comprises an indication of a programming language, and wherein the model code comprises computer instructions written in the programming language.

14. The apparatus of claim 9, wherein the configuration file comprises an indication of the model standardization condition, and wherein the monitoring engine is further configured to:
record, to a monitoring log, violation data describing the violation of the model standardization condition.

15. The apparatus of claim 9,
wherein the configuration file comprises an indication of a model environment,
wherein the indication of the model environment is drawn from a list of model environments,
wherein the list of model environments comprises training, testing, and production, and
wherein causing the execution of the machine learning pipeline uses the model environment.

16. The apparatus of claim 9, wherein the communications hardware is further configured such that receiving the model output data comprises storing the model output data on a cloud data store, and wherein the configuration file comprises an indication of storing the model output data to the cloud data store.

17. An apparatus for automated model development, the apparatus comprising:
- means for parsing a configuration file indicating a machine learning model;
- means for generating, based on the parsed configuration file, model code for training and testing the machine learning model;
- means for generating a machine learning pipeline, wherein the machine learning pipeline comprises the model code and a data processing engine;
- means for instantiating a monitoring engine to monitor the machine learning pipeline;
- means for causing execution of the machine learning pipeline;
- means for, during the execution of the machine learning pipeline:
  - detecting a modification of a parameter of the machine learning model,
  - determining, based on the modification of the parameter of the machine learning model, a violation of a model standardization condition, and
  - generating model performance data in real time simultaneously with execution of the model code of the machine learning pipeline, wherein the model performance data comprises an indication of the violation of the model standardization condition; and
- means for receiving model output data, wherein the model output data comprises a trained model and model performance data.

18. The apparatus of claim 17, further comprising:
- means for accessing a data store;
- means for retrieving a data feature from the data store; and
- means for providing the data feature to the model code.

19. The apparatus of claim 18, wherein the data store comprises a low-latency data source, and wherein means for providing the data feature to the model code comprises:
- staging, by the data processing engine, the data feature to a low-latency memory.

20. The apparatus of claim 18, wherein the data store comprises a cloud data source, and wherein means for providing the data feature to the model code comprises:
- staging, by the data processing engine, the data feature to a local memory from the cloud data source.

* * * * *